(12) United States Patent
Johnson et al.

(10) Patent No.: US 7,483,375 B2
(45) Date of Patent: *Jan. 27, 2009

(54) TCP/IP/PPP MODEM

(75) Inventors: Michael Ward Johnson, Petaluma, CA (US); John Shigeto Minami, San Jose, CA (US); Ryo Koyama, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 946 days.

This patent is subject to a terminal disclaimer.

(21) Appl. No.: 10/851,357

(22) Filed: May 20, 2004

(65) Prior Publication Data

US 2004/0213290 A1    Oct. 28, 2004

Related U.S. Application Data

(63) Continuation of application No. 09/321,902, filed on May 28, 1999, now Pat. No. 6,765,901.

(60) Provisional application No. 60/088,865, filed on Jun. 11, 1998.

(51) Int. Cl.
G08C 15/00 (2006.01)
H04L 12/56 (2006.01)
G06F 15/173 (2006.01)

(52) U.S. Cl. ............... 370/235; 370/395.5; 709/224

(58) Field of Classification Search ............ 370/229, 370/230, 235, 389, 392, 395.5, 395.52, 464, 370/465, 466, 467, 469, 471; 709/223, 224, 709/225, 229

See application file for complete search history.

(56) References Cited

U.S. PATENT DOCUMENTS

| 5,606,594 | A |   | 2/1997  | Register et al. ............... 379/58 |
|-----------|---|---|---------|----------------------------------------|
| 5,674,003 | A | * | 10/1997 | Andersen et al. ............ 709/228   |
| 5,678,041 | A | * | 10/1997 | Baker et al. ..................... 707/9 |
| 5,722,076 | A |   | 2/1998  | Sakabe et al. ............... 455/450  |
| 5,752,078 | A | * | 5/1998  | Delp et al. ..................... 710/7 |
| 5,764,955 | A |   | 6/1998  | Doolan ........................ 395/500 |
| 5,838,916 | A | * | 11/1998 | Domenikos et al. ......... 709/219    |
| 5,865,480 | A |   | 2/1999  | Bain et al. .................... 292/67 |
| 5,894,557 | A |   | 4/1999  | Bade et al. ................... 709/228 |
| 5,956,391 | A |   | 9/1999  | Melen et al. ................. 379/114 |
| 5,956,651 | A |   | 9/1999  | Willkie et al. ............... 455/553 |

(Continued)

FOREIGN PATENT DOCUMENTS

WO    WO 95/14356    5/1995

(Continued)

OTHER PUBLICATIONS

Preston, David J. "Internet Protocols Migrate to Silicon for Networking Devices" vol. 45 No. 8, Apr. 14, 1997.

(Continued)

Primary Examiner—Seema S Rao
Assistant Examiner—Christine Duong
(74) Attorney, Agent, or Firm—Zilka-Kotab, PC

(57) ABSTRACT

An Internet network protocol stack, along with special logic, is embedded with a modem, thereby enabling a modem to become Internet-ready. As a result, the modem offloads much of the network protocol processing from the main CPU and improves the overall performance of the communication system.

48 Claims, 8 Drawing Sheets

U.S. PATENT DOCUMENTS

| | | | | |
|---|---|---|---|---|
| 5,970,066 | A | 10/1999 | Lowry et al. | 370/353 |
| 5,974,463 | A | 10/1999 | Warrier et al. | 709/225 |
| 5,983,271 | A * | 11/1999 | Alexander et al. | 709/227 |
| 5,983,350 | A | 11/1999 | Minear et al. | 713/201 |
| 6,012,096 | A * | 1/2000 | Link et al. | 709/233 |
| 6,034,963 | A | 3/2000 | Minami et al. | 370/401 |
| 6,058,421 | A | 5/2000 | Fijolek et al. | 709/225 |
| 6,075,796 | A * | 6/2000 | Katseff et al. | 370/466 |
| 6,148,336 | A * | 11/2000 | Thomas et al. | 709/224 |
| 6,226,680 | B1 | 5/2001 | Boucher | 709/230 |
| 6,247,060 | B1 | 6/2001 | Boucher | 709/238 |
| 6,295,293 | B1 | 9/2001 | Tonnby et al. | 370/389 |
| 6,301,258 | B1 * | 10/2001 | Katseff et al. | 370/412 |
| 6,304,574 | B1 * | 10/2001 | Schoo et al. | 370/401 |
| 6,304,578 | B1 * | 10/2001 | Fluss | 370/413 |
| 6,334,153 | B2 | 12/2001 | Boucher | 709/230 |
| 6,389,479 | B1 | 5/2002 | Boucher | 709/243 |
| 6,393,487 | B2 | 5/2002 | Boucher | 709/238 |
| 6,427,171 | B1 | 7/2002 | Craft | 709/230 |
| 6,427,173 | B1 | 7/2002 | Boucher | 709/238 |
| 6,434,620 | B1 | 8/2002 | Boucher | 709/230 |
| 6,470,415 | B1 | 10/2002 | Starr | 711/104 |
| 6,515,996 | B1 * | 2/2003 | Tonnby et al. | 370/401 |
| 6,591,302 | B2 | 7/2003 | Boucher | 709/230 |
| 6,658,480 | B2 | 12/2003 | Boucher | 709/239 |
| 6,687,758 | B2 | 2/2004 | Craft | 709/250 |
| 6,697,868 | B2 | 2/2004 | Craft | 709/230 |
| 6,751,665 | B2 | 6/2004 | Philbrick | 709/224 |
| 6,757,746 | B2 | 6/2004 | Boucher | 709/250 |
| 6,765,901 | B1 | 7/2004 | Johnson et al. | 370/352 |
| 6,807,581 | B1 | 10/2004 | Starr | 709/250 |
| 6,938,092 | B2 | 8/2005 | Burns | 709/230 |
| 6,941,386 | B2 | 9/2005 | Craft | 709/250 |
| 6,965,941 | B2 | 11/2005 | Boucher | 709/230 |
| 6,996,070 | B2 | 2/2006 | Starr | 370/252 |
| 7,042,898 | B2 | 5/2006 | Blightman | 370/463 |
| 2001/0021949 | A1 | 9/2001 | Blightman | 709/219 |
| 2001/0023460 | A1 | 9/2001 | Boucher | 709/250 |
| 2001/0027496 | A1 | 10/2001 | Boucher | 709/250 |
| 2001/0036196 | A1 | 11/2001 | Brightman | 370/465 |
| 2001/0037397 | A1 | 11/2001 | Boucher | 709/230 |
| 2001/0037406 | A1 | 11/2001 | Philbrick | 709/250 |
| 2001/0047433 | A1 | 11/2001 | Boucher | 709/250 |
| 2002/0087732 | A1 | 7/2002 | Boucher | 709/250 |
| 2002/0091844 | A1 | 7/2002 | Craft et al. | 709/230 |
| 2002/0091884 | A1 | 7/2002 | Craft | 709/230 |
| 2002/0095519 | A1 | 7/2002 | Philbrick | 709/250 |
| 2002/0147839 | A1 | 10/2002 | Boucher | 709/250 |
| 2002/0156927 | A1 | 10/2002 | Boucher | 709/250 |
| 2002/0161919 | A1 | 10/2002 | Boucher | 709/238 |
| 2003/0079033 | A1 | 4/2003 | Craft | 709/230 |
| 2003/0140124 | A1 | 7/2003 | Burns | 709/220 |
| 2003/0167346 | A1 | 9/2003 | Craft | 709/250 |
| 2003/0200284 | A1 | 10/2003 | Philbrick | 709/219 |
| 2004/0003126 | A1 | 1/2004 | Boucher | 709/250 |
| 2004/0054813 | A1 | 3/2004 | Boucher | 709/250 |
| 2004/0062245 | A1 | 4/2004 | Sharp | 370/392 |
| 2004/0062246 | A1 | 4/2004 | Boucher | 370/392 |
| 2004/0064578 | A1 | 4/2004 | Boucher | 709/236 |
| 2004/0064589 | A1 | 4/2004 | Boucher | 709/250 |
| 2004/0064590 | A1 | 4/2004 | Starr | 709/250 |
| 2004/0073703 | A1 | 4/2004 | Boucher | 709/245 |
| 2004/0078462 | A1 | 4/2004 | Philbrick | 709/224 |
| 2004/0088262 | A1 | 5/2004 | Boucher | 705/65 |
| 2004/0100952 | A1 | 5/2004 | Boucher | 370/389 |
| 2004/0111535 | A1 | 6/2004 | Boucher | 709/250 |
| 2004/0117509 | A1 | 6/2004 | Craft | 709/250 |
| 2004/0158640 | A1 | 8/2004 | Philbrick | 709/230 |
| 2004/0158793 | A1 | 8/2004 | Blightman | 714/758 |
| 2004/0240435 | A1 | 12/2004 | Boucher | 370/352 |
| 2005/0122986 | A1 | 6/2005 | Starr | 370/412 |
| 2005/0141561 | A1 | 6/2005 | Craft | 370/474 |
| 2005/0160139 | A1 | 7/2005 | Boucher | 709/203 |
| 2005/0175003 | A1 | 8/2005 | Craft | 370/389 |
| 2005/0182841 | A1 | 8/2005 | Sharp | 709/228 |
| 2005/0198198 | A1 | 9/2005 | Craft | 709/217 |
| 2005/0204058 | A1 | 9/2005 | Philbrick | 709/238 |
| 2005/0278459 | A1 | 12/2005 | Boucher | 709/250 |
| 2006/0010238 | A1 | 1/2006 | Craft | 709/227 |
| 2007/0062245 | A1 | 3/2007 | Fuller et al. | 72/413 |

FOREIGN PATENT DOCUMENTS

| | | | |
|---|---|---|---|
| WO | WO 00013091 A1 | 3/2000 | |

OTHER PUBLICATIONS

Portable Computer Communications Association, "The IP Modem Interface Standard" May 6, 1998.

Sally Floyd, "Link-Sharing and Resource Management Models for Packet Networks" Feb. 7, 1995.

Massimo Marchiori, "The Limits of Web Metadata, and Beyond" http://decweb.ethz.ch/www7/1896/com1896.htm.

European Office Action from European Application No. 99 927 463. 2-1525 mailed Oct. 19, 2005.

PCT International Preliminary Examination Report from PCT/US99/13184 mailed May 30, 2000.

PCT International Search Report from PCT/US99/13184 mailed Sep. 11, 1999.

W. Richard Stevens, "TCP/IP Illustrated vol. 1; The Protocols", Addison-Wesley Professional Computing Series.

Written Opinion from PCT/US99/11595 mailed May 26, 2000.

Office Action from Canadian Application No. 2,328,829 mailed Oct. 28, 2002.

Notice to Submit Argument from Korean Associate, Oct. 11, 2002.

Notice of Refusal Ruling form Korean Associate, Mar. 28, 2003.

Notice of Rejection from Korean Associate, Mar. 19, 2002.

European Office Action from European Application No. 99 927 463. 2-1525 mailed Mar. 14, 2006.

U.S. Appl. No. 11/546,178, filed Oct. 10, 2006.

U.S. Appl. No. 11/546,492, filed Oct. 10, 2006.

Final Office Action Summary from U.S. Appl. No. 09/321,902 mailed on Apr. 17, 2003.

Office Action Summary from U.S. Appl. No. 09/321,902 mailed on Sep. 10, 2003.

Office Action Summary from U.S. Appl. No. 09/321,902 mailed on Nov. 7, 2002.

* cited by examiner

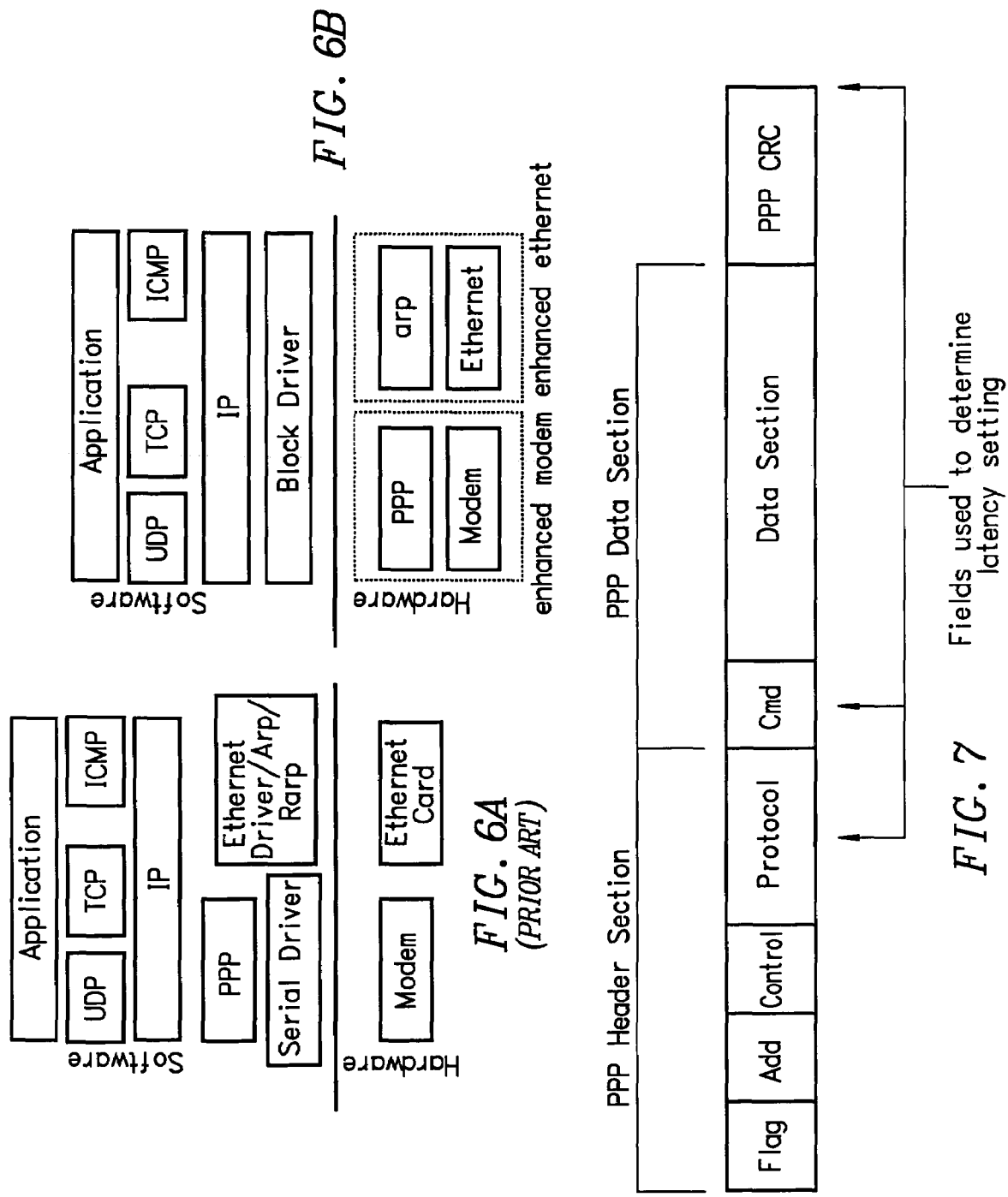

TCP/IP/PPP MODEM

This application is a continuation of U.S. patent application Ser. No. 09/321,902, filed May 28, 1999 now U.S. Pat. No. 6,765,901 which claims priority from U.S. provisional application Ser. No. 60/088,865 filed on Jun. 11, 1998.

BACKGROUND OF THE INVENTION

1. Technical Field

The invention relates to combining a network stack with a modem core for use in both computer and non-computer applications. More particularly, the invention relates to an Internet-aware modem which combines any number of point-to-point devices with the network protocols necessary to communicate on the Internet, where these devices include various speed traditional modems from 2400 kbps to 56 kbps, ISDN modems, newer xDSL modems, and digital cellular modems.

2. Description of the Prior Art

Computer modems were developed in a time when most connections were made to proprietary online services, interactive terminals, bulletin board services (BBSs), or corporate network systems. As such, it was necessary to implement connection protocols in software because there existed at the time a number of such protocols. These protocols included x-modem, y-modem, z-modem, kermit, and interactive character based interfaces.

Today, with popularity of the Internet, a vast majority of modems are now used exclusively to connect with ISP's, which in turn connect the user to the Internet. Therefore, there is now a predominant set of connection protocols. Such protocols are used for most modem connections. Accordingly, there is a real need and advantage in designing a modem that is Internet-ready.

The connection protocols used by the Internet and their hierarchical relationship are shown in FIG. 1. These protocols include TCP 10, IP 11, UDP 13, and PPP 12. Optimizing a modem for use with the Internet offers many advantages including reduced transmission latency, reduced servicing requirements, lower processing requirements from the system's CPU, and optimized transmission rates.

Current computer systems treat a modem subsystem as a serial device. A block diagram of an existing system is shown in FIG. 2. In such systems, an Internet application, such as a Web browser 21, is run in software 19 on the main CPU 22. This application, in turn calls upon the computer network stack 23, which is also implemented in software. The network stack implements the TCP, IP, UDP, and PPP protocols. Once the data have been processed, the resulting packets are sent by the CPU via the computer bus 28 to a serial port interface 27 in the modem system 20. The modem system, for example a modem card 18, is seen as a serial I/O device by the host processor. These devices usually accept data in byte quantities and place them in an outgoing FIFO 24. These FIFOs can be anywhere from 8 bytes to 64 bytes. The CPU normally writes a fixed number of bytes, then waits for the serial I/O device to notify it that all the data have been sent and that it is ready to accept more data. This notification is usually done via system interrupts. The packet data, after it is written into the FIFO, is fed to the modem core 25 at the outgoing data rate and thence to the telephone line 29.

For received data, the modem first places all incoming packets into the input FIFO 26. The device can then be configured to interrupt the host CPU when any data are available or when the received data reaches some level (i.e. 16 bytes). When notified, the CPU reads all the data in the input FIFO, and stores the data temporarily in a buffer in system memory (not shown). The bottom protocol, PPP (see FIG. 1) can start to process the data, but it cannot pass up the data to the next layer until the entire packet is received.

Once the whole packet is received, the PPP portion of the software network stack passes the data up to the second protocol (IP). The IP software then processes the IP header and, after verifying the header checksum, passes the packet to the TCP handler. The TCP handler then checks its checksum, and passes the data on to the appropriate application, as specified by the PORT number in the TCP header.

Because most modems in computers today are used to connect to the Internet, it makes it economically feasible and practical to optimize a modem for this environment. What this entails is embedding in the modem system, the ability to handle the necessary network protocols and use the knowledge of the protocols to tune the transmission characteristics of the modem. This is the same rationale behind the popularity of Window's accelerator graphics cards. Because graphic chip manufacturers know that a vast majority of PC's today run the Microsoft Windows® operating system, they fine-tune their architectures to enhance the performance in this environment. This would not be practical if there were a number of operating systems with different graphic APIs, each with a significant portion of the market place. However, with the one over-riding standard, most graphic card manufactures have chosen to optimize their hardware for the Windows environment, even though today's Pentium class processors are very capable of handling the graphic chores without external support. This is because the function is required in most circumstances, and it is advantageous to offload the host processor so that it has that much more MIPs to run standard applications.

A similar situation now exists in the modem card market. It would therefore be advantageous to embed the Internet network protocol stack, along with special logic, thereby enabling the modem device to become Internet-ready, such that the modem system offloads much of the network protocol processing from the main CPU, while improving the overall performance of the communication system.

SUMMARY OF THE INVENTION

The invention embeds the Internet network protocol stack, along with special logic, thereby enabling the modem device to become Internet-ready. As a result, the modem system offloads much of the network protocol processing from the main CPU and improves the overall performance of the communication system. The invention provides an Internet-aware modem which combines any number of point-to-point devices with the network protocols necessary to communicate on the Internet, where these devices include various speed traditional modems from 2400 kbps to 56 kbps, ISDN modems, newer xDSL modems, and digital cellular modems.

Sending Data

In a system equipped with an Internet-ready modem, the Internet application first sets up the socket parameters. These include the destination port number, the type of connection (TCP/UDP), the TOS (Type-Of-Service) requirements, and the destination IP address. When the network stack on an Internet-ready modem card gets this information, it attempts to start a connection by sending out a SYN packet. This packet is passed to the IP engine, which attaches the IP header and calculates the IP header checksum. The packet is then passed to the PPP handler which attaches the PPP header, appends the PPP checksum, and escapes the data. After PPP encapsulation, the resulting network packet is sent through the output FIFO to the modem core. For this packet, the TCP engine indicates to the packet analyzer block that it is a SYN packet. The packet analyzer then indicates to the modem that this is a stand alone packet and that it can be sent immediately. Upon receiving this information, the modem sends the network packet out without first waiting the normal 50 ms to see if additional information is forthcoming.

After the destination socket sends a return SYN-ACK packet, an ACK packet is sent from the modem card. This packet follows the same steps as those for the SYN packet. At this point, the socket connection is up, and the application software (such as a Web browser) is notified. The application can now send its data directly to the modem in a data packet format. In this example, where the application is a Web browser, the application can send an HTTP request directly to the modem system via a packet interface as opposed to the serial port I/O interface in a regular modem system. DMA style data transports can be used for this purpose. In this method, a data byte count is programmed into the packet interface. Data can then be automatically transferred from memory into a modem card without further intervention from the host CPU. After all the data have been transferred, an interrupt from the modem card can be sent to the host CPU indicating that the data transfer is complete.

As the data arrive at the modem card, they are sent (in this example) to a TCP data output buffer. After all the data are received or when the maximum data size per packet has been received, the TCP block begins calculating the checksum. The packet is encapsulated in the same way as the SYN packet. In parallel to this, the TCP engine indicates to the packet analyzer block that the destination port for the packet is 80, which is the well-known HTTP port. The packet analyzer then knows that there are no more data and, again, the modem should send the current packet immediately.

Receiving Data

When receiving network packets, the data are sent from the modem core through the input FIFO to the PPP engine, which parses the PPP header, unescapes the data, and starts a running check on the packet for checksum calculations. If the engine determines that the encapsulated data is an IP packet, it enables the IP engine, and all data past the PPP header is forwarded to the IP engine. The IP engine parses the IP header, checks the checksum, and if it determines that the encapsulated protocol is TCP, then it sends all data past the IP header to the TCP engine. The TCP engine then parses the TCP header and sends the data portion to the security layer. If the data is HTML data, it can be passed through a ratings check that parses out rating tags of pages. If the page has a rating below or equal to the modem cards setting, then the data are allowed to pass. If the rating exceeds the setting on the card, a message indicating so is passed on instead. If the page contains no ratings, a bit can be set to either pass or block the page. All non-HTML data are passed directly to the TCP data buffer.

As the data are being written into the buffer, a running count is kept to see how much data have been received. At the end of the network packet, if the PPP checksum indicates that the entire packet was received without errors, then an interrupt can be generated to the host CPU. The application can then read the received data count, and program a DMA transfer to transfer data from the TCP buffer into main memory.

BRIEF DESCRIPTION OF THE DRAWINGS

FIG. 6a is a block schematic diagram showing a prior art modem and network card;

FIG. 6b is a block schematic diagram showing a modem according to the invention and an enhanced Ethernet network card;

FIG. 7 is a schematic diagram showing fields used in a PPP protocol packet to determine latency according to the invention;

DETAILED DESCRIPTION OF THE INVENTION

Figure 1:
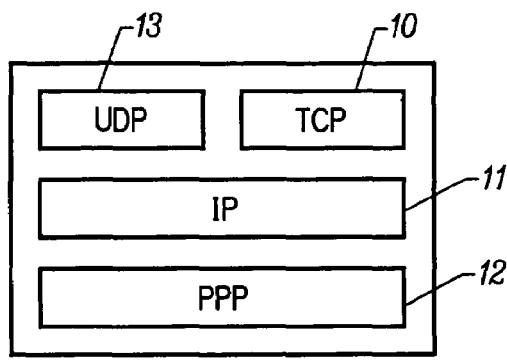
FIG. 1 is a block diagram showing connection protocols used by the Internet and their hierarchical relationship.

The invention provides an Internet-aware modem which combines any number of point-to-point devices with the network protocols necessary to communicate on the Internet, where these devices include various speed traditional modems from 2400 kbps to 56 kbps, ISDN modems, newer xDSL modems, and digital cellular modems. The invention embeds the Internet network protocol stack, along with special logic, thereby enabling the modem device to become Internet-ready. As a result, the modem system offloads much of the network protocol processing from the main CPU and improves the overall performance of the communication subsystem.

The invention provides several technologies that enhance modem performance and efficiency when used with Internet protocols. These technologies include:

Block Based Communication,

Latency Optimization,

Reduced Processing Power,

Reduced Energy Requirements, and

Security Enhancements.

Data Transfer Overhead Reduction

Modems today all communicate via serial ports. This serial communication has several performance disadvantages over other communications devices, such as Ethernet adapters, which communicate to the host CPU by sending and receiving blocks of data via DMA (Direct Memory Access).

Serial Communications

Serial communication using older serial hardware (e.g. UARTs) require an interrupt for every character sent or received. This causes so much overhead that it is not possible to communicate at speeds over 19200 bps without dropping data on most computer systems. Second generation serial hardware (e.g. the 16550 UART and its derivatives) are able to buffer up to 16 bytes on send and receive and can delay interrupts until a buffer reaches a certain level. This reduces the number of interrupts required to transfer data to and from the modem. This allows modern modems to achieve serial data rates of 56000 bps to 230400 bps without losing data on most CPU's.

Although high speed serial communication using second generation serial hardware is now possible, at these higher data rates serial communications can cause a noticeable degradation in system performance, especially when the computer system is running Internet enabled action games or multi-media communication programs. Thousands of interrupts each second are required at the higher data rates (see Table 1 below.)

TABLE 1

Serial Interrupt Requirement Example

Given a 16550 UART with interrupts set at:
    16 bytes transmit trigger
    14 bytes receive trigger
Receive interrupts:
230400bps/9bits per byte=25600Bps/14 bytes per interrupt =
1828 interrupts per second.
Transmit Interrupts:
230400bps/9bits per byte = 25600Bps/16 bytes per interrupt =
1600 interrupts per second.

Each interrupt requires an interrupt service routine to read and write data to/from the serial hardware and to/from the Computers Operating System. These interrupt routines read and write to I/O ports that are not efficient use of system resources.

Optimizing Using Block Transfers

There has been talk about a next generation UART that would have either 32 or 64 byte buffers to reduce the number of interrupts and load on a system. While this may be helpful, the inventor's have recognized that the correct solution is to optimize the modem for Internet protocols and transfer data as blocks of data packets.

Block based Communication to/from modems has not been previously considered because the Internet protocols designed to interface a modem/serial device are serial based (SLIP/PPP) and are traditionally implemented in the computer system's operating system. Using the herein described invention, it is advantageous to move the network stack protocols from the computer operating system into the modem. The layers of the network protocol that can be implemented in a hardware device in accordance with the invention can range from just the PPP layer all the way to the IP, TCP, and UDP layers.

EXAMPLE

Block Based Interrupt Requirement

Assuming an average 100-byte IP packet:
25600 Bps/100=256 Interrupts per second.

As is shown in the above example, transferring blocks instead of chunks of characters, as in the serial solution, reduces the number of interrupts required. An added benefit is that the transfer routine can use direct memory access (DMA) to pass data instead of slower I/O port pumping. Currently serial port hardware and software do not support DMA.

This enables the development of software that can produce faster, more efficient data handling routines because the host CPU is relieved of handling transferring of individual bytes of data.

Reduced Latency

Once the modem knows that it is dealing with IP packets, it has knowledge of where data units start and stop. Modem protocols, such as V.42 and V.42bis, can be optimized to take advantage of this knowledge.

V.42 has an outdated view of what kind of data are being carried over a modem, but if the network stack is embedded alongside a modem core, it can indicate to the modem core the end of data units. The modem core can then segment its V.42 packets accordingly. This reduces latency on retransmission because retransmission would have a higher probability of affecting only one IP packet. Knowledge of the end of a packet can also be used to reduce the waiting for more data timeout that the V.42 protocol introduces. If it is known that the last byte received is an end of a physical block of data, the modem need not wait around, or can reduce the time it waits, for more data to be sent to it before it sends that data it has ready to send.

This aspect of the invention can be extended to perform IP and TCP packet snooping to optimize further what gets sent when and how long the V.42 protocol waits before compressing and sending the current block. For example, the TOS field in the IP header can be used to determine the amount of latency used in the transmission of the packet. If the packet is a high priority packet the system may decide to send the packet immediately, not checking to determine if there are more packets ready to send. The system can wait varying lengths of time for more data based on this TOS information.

Additional latency optimization can be achieved by checking the TCP header. If the SYN flag is set in the TCP header, then the data should also be sent immediately because nothing more can happen until the SYN-ACK is returned from the other side of the connection.

Also, unlike previous advances to modem technology that required that the same technical advances be on both the receiving and sending ends of the communications link, the herein disclosed modem can operate and is compatible with all existing modems today. Therefore, it is possible to gain performance increases by updating only one end of the connection. In this way, adoption of the technology is not dependent on changes in ISP infrastructure.

Reduced Processing Power Required from Host CPU

By embedding the network stack along with the modem core, a marked reduction in processing power that is required to connect and communicate on the internet is possible. This allows small, low power, low cost devices to communicate via the Internet using modems. Examples of these types of devices include game consoles, PDAs, toys, and other consumer electronic and mobile electronic appliances.

Processor Power Reduction of PPP

The PPP protocol requires that packets include a CRC appended at the end of each packet. This calculation requires what could be a significant amount of processing power on low-end processors. Other aspects of the protocol, such as escaping data and parameter negotiations, require memory accesses for each byte when implemented as a software solution. By implementing PPP in the modem, all negotiations can be kept local to the modem subsystem, thereby relieving system bus traffic and processing overhead.

Processor Power Reduction of Embedding IP

Embedding IP offloads the header checksum calculations from the host processor. It also keeps ICMP echo packet processing local to the modem card. This protocol is used for PING applications.

Processor Power Reduction of Embedding UDP

Though it is possible to use UDP as an encapsulation device requiring little processing power, when used with checksums, UDP can require some processor resources. It should be noted here that most thin Internet clients are based on IP/UDP to transmit their data.

Processor Power Reduction of Embedding TCP

TCP is a much more complicated protocol than UDP and, thus, requires much more processing power. The TCP has many states and requires checksums to be preformed on packets. For embedded products that require TCP support the invention described herein provides a way to offload all the complexity and processor requirements onto a dedicated hardware circuit.

Portability of Solution

By embedding the network stack inside of the modem subsystem, the same modem system can now be used across multiple computing and system platforms. Because no porting of any network stack software is required, moving the modem into different systems becomes very easy. This is especially important in the embedded systems market that does not have one or two main OS's but instead is made up of a number of different OS's, RTOS's, and in some cases, no OS. The embedded systems market is also characterized by being made up of a number of incompatible processors. This lack of an overriding standard also favors a highly portable network solution.

Reduced Energy Requirements

The herein described invention is also very efficient in terms of energy requirements. A highly optimized state machine reduces by two orders of magnitude the clock rate required to perform the functionality of the Internet suite of protocols. This translates into extended battery life and less heat generated by products designed with the herein described invention.

Security Enhancements

By implementing the network stack in hardware along with the modem, the invention provides a very secure, unhackable network stack. This is due to the hardware architecture implementation that disregards any packet received unless there is already a socket connection set up for it. Furthermore, the packets do not get past the modem card, therefore making any interaction between unrequested packets and software impossible.

In addition, by including an HTML packet sniffer, it is possible to decode HTML rating tags. The packet sniffer interprets bytes in the packet buffer, and can be set up to pass only those pages that are within its preset rating level. For pages that exceed the programmed rating level, the HTML sniffer passes up a failed retrieval message, and does not allow the HTML content past the modem subsystem. This turns the modem into a content driven mini-firewall.

For those pages that do not include a rating tag, the sniffer can be configured either not to pass these pages at all, or to allow the pages to be passed. The rating level can be programmed only via board settings, i.e. hard wired. The advantage of implementing this solution in hardware is that for parents or anyone who wishes to filter out certain Web sites, it is impossible to get around this system without taking the modem card out of the system. With any software solution, the user could simply load a non-filtering browser or disable a certain plug-in, and the filter would be bypassed. By providing the filter in hardware on the modem card, there is no way to bypass the function.

System Implementation

Figure 3:
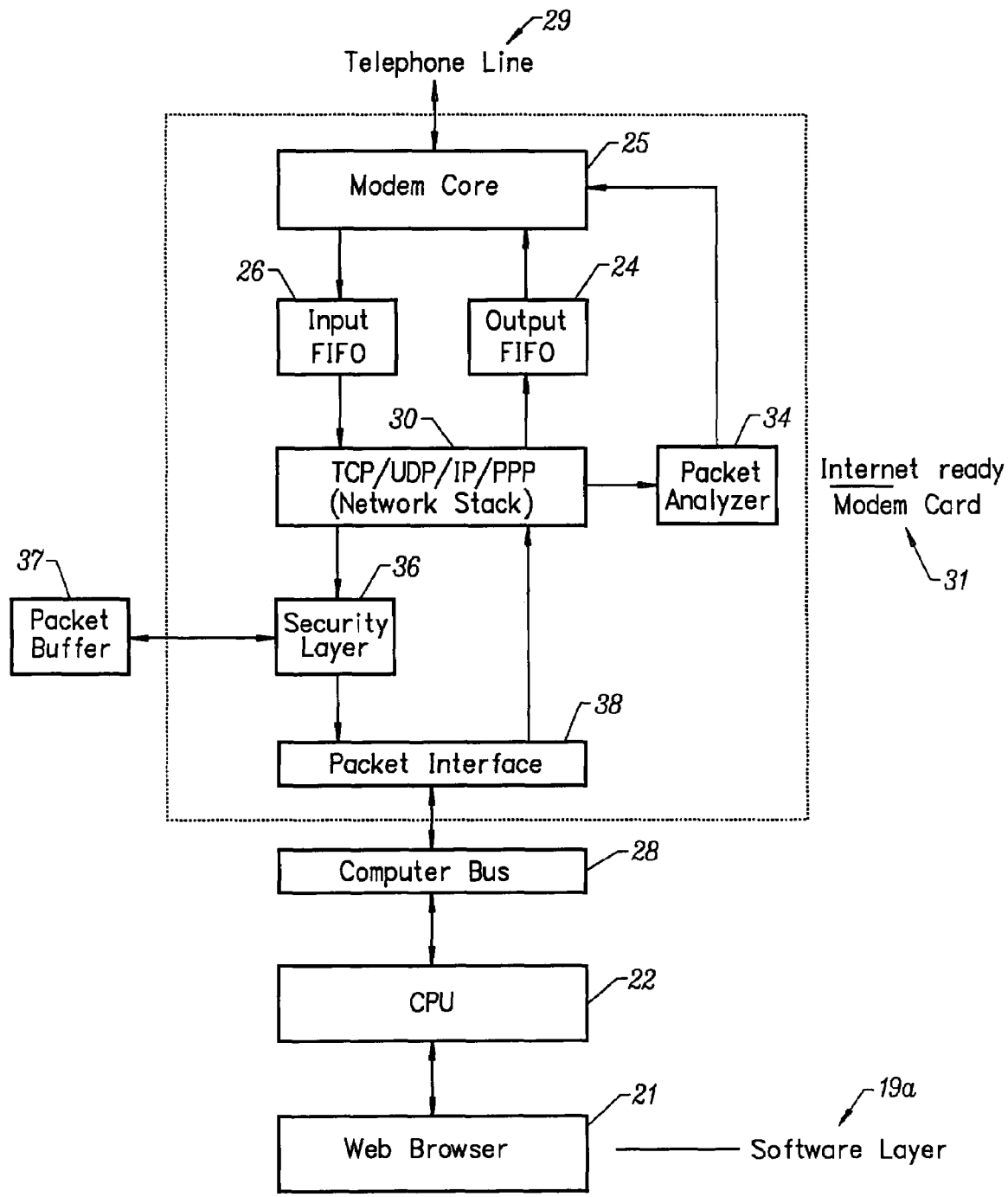
FIG. 3 is a block schematic diagram showing an Internet-ready modem system according to the invention.

FIG. 3 is a block schematic diagram of an Internet-ready modem system.

Sending Data

In a system equipped with an Internet-ready modem 31, the Internet application first sets up the socket parameters. These include the destination port number, the type of connection (TCP/UDP), the TOS (Type-Of-Service) requirements, and the destination IP address. When the network stack 30 on the Internet-ready modem 31 gets this information, it attempts to start a connection by sending out a SYN packet. This packet is passed to the IP engine within the network stack, which attaches the IP header and calculates the IP header checksum. The packet is then passed to the PPP handler within the network stack which attaches the PPP header, appends the PPP checksum, and escapes the data. After PPP encapsulation, the resulting network packet is sent through the output FIFO 32 to the modem core 33. For this packet, the TCP engine indicates to the packet analyzer block 34 that it is a SYN packet. The packet analyzer 34 then indicates to the modem that this is a stand alone packet and that it can be sent immediately. The modem upon receiving this information sends the network packet out without waiting the normal 50 ms to see if additional information is forthcoming.

After the destination socket sends a return SYN-ACK packet, an ACK packet is sent from the modem card. This packet follows the same steps as those for the SYN packet. At this point, the socket connection is up, and the application software (such as a Web browser 21) is notified. The application can now send its data directly to the modem in a data packet format.

Figure 2:
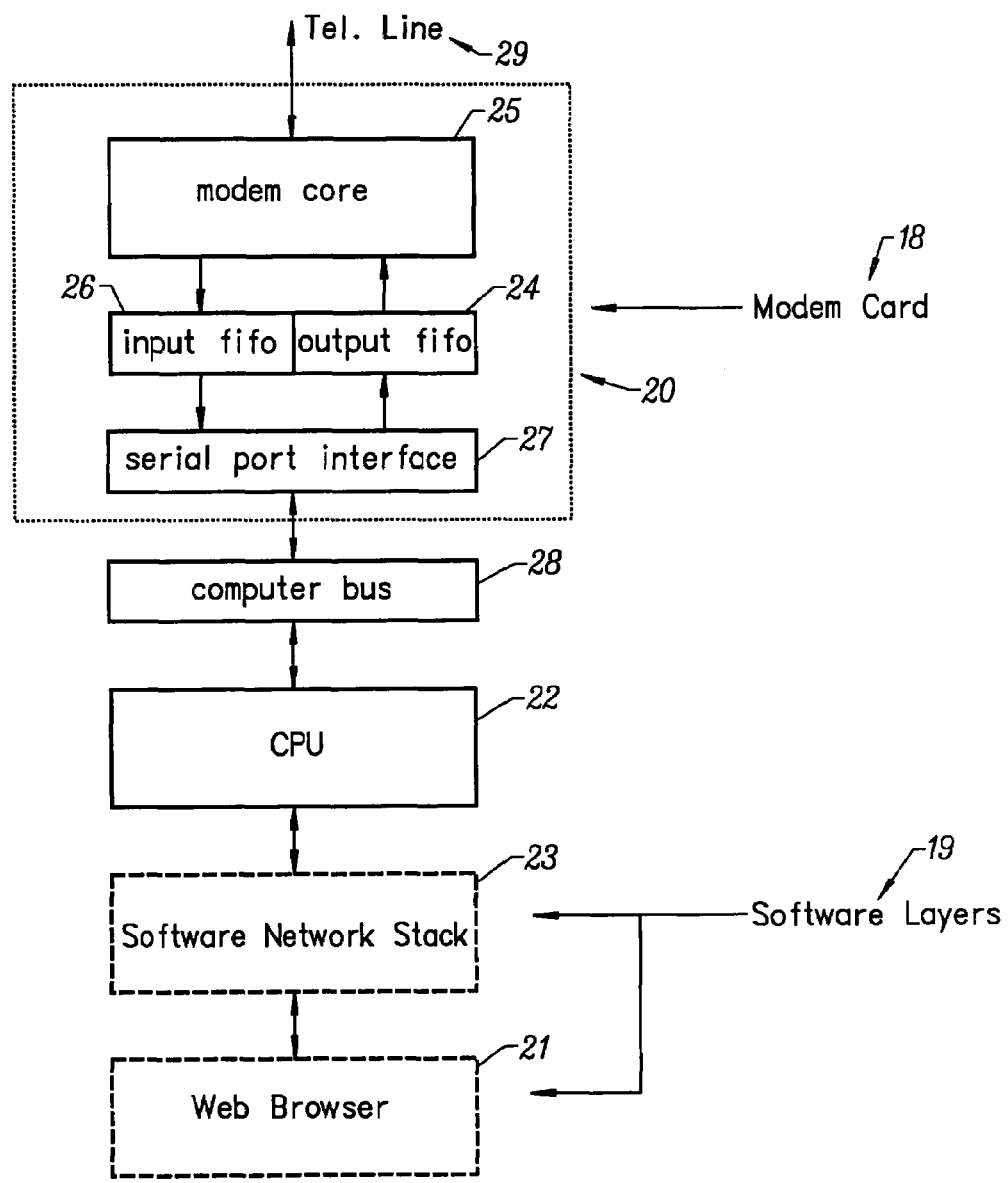
FIG. 2 is a block diagram showing a typical modem subsystem.

In the example shown in FIG. 3, where the application is a Web browser, the application can send an HTTP request directly to the modem system via a packet interface 38 as opposed to the serial port I/O interface in a regular modem system (see FIG. 2). DMA style data transports can be used for this purpose. In this method, a data byte count is programmed into the packet interface. Data can then be automatically transferred from memory into a modem card without further intervention from the host CPU. After all the data have been transferred, an interrupt from the modem card can be sent to the host CPU 23 indicating that the data transfer is complete.

As the data arrive at the modem card, they are sent (in this example) to a TCP data output buffer. After all the data are received or when the maximum data size per packet has been received, the TCP block begins calculating the checksum. The packet is encapsulated in the same way as the SYN packet. In parallel to this, the TCP engine in the network stack indicates to the packet analyzer block that the destination port for the packet is 80, which is the well-known HTTP port. The packet analyzer then knows that there are no more data and, again, the modem should send the current packet immediately.

Receiving Data

When receiving network packets, the data are sent from the modem core 33 through the input FIFO 35 to the PPP engine in the network stack, which parses the PPP header, unescapes the data, and starts a running check on the packet for checksum calculations. If the engine determines that the encapsulated data is an IP packet, it enables the IP engine in the network stack, and all data past the PPP header is forwarded to the IP engine. The IP engine parses the IP header, checks the checksum, and if it determines that the encapsulated protocol is TCP, then it sends all data past the IP header to the TCP engine in the network stack. The TCP engine then parses the TCP header and sends the data portion to the security layer 36. If the data is HTML data, it can be passed through a ratings check that parses out rating tags of pages. If the page has a rating below or equal to the modem cards setting, then the data are allowed to pass. If the rating exceeds the setting on the card, a message indicating so is passed on instead. If the page contains no ratings, a bit can be set to either pass or block the page. All non-HTML data are passed directly to the TCP data buffer 37.

As the data are being written into the buffer, a running count is kept to see how much data have been received. At the end of the network packet, if the PPP checksum indicates that the entire packet was received without errors, then an interrupt can be generated to the host CPU 23. The application can then read the received data count, and program a DMA transfer to transfer data from the TCP buffer into main memory.

Features of the Invention

The following discussion describes various features of the invention:
1. Modem as a Block Device.
2. Latency Optimization based on packet parameters:
   a) Basic End of Packet Optimization,
   b) Optimization based on IP TOS flag,
   c) Optimization based on UDP/TCP port numbers,
   d) Optimization based on TCP State, and
   e) Latency Table.
3. Modem as a complete Internet Access Device:
   a) Partial Stack solutions:
     i) PPP/IP,
     ii) PPP/IP/ICMP, and
     iii) PPP/IP/ICMP/UDP; and
   b) Complete Stack Solutions (PPP/IP/ICMP/UDP/TCP).
4. Enhanced Security and HTML filtering in an Internet enabled Modem.

The following discussion describes the above features in more detail.

Modem as a Block Device

Depending on the network layers included with the modem hardware, different data formats are sent to the modem subsystem. In any of the implementations, however, DMA transfers can be used to optimize CPU overhead required for the transfers.

Figure 4:
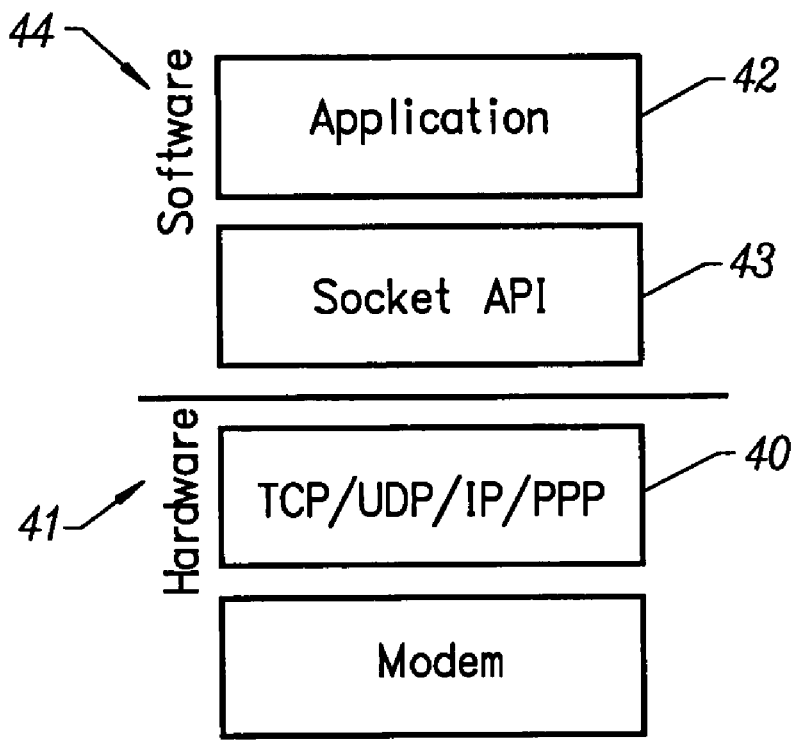
FIG. 4 is a block schematic diagram showing a modem having a full network stack according to the invention.

Refer to FIG. 4 for the following discussion. In the implementation where the entire network stack 40 is included with the modem card 41, only the application 42 data need be transferred. Software applications 44 communicate with the modem card via a socket API 43.

Figure 5:
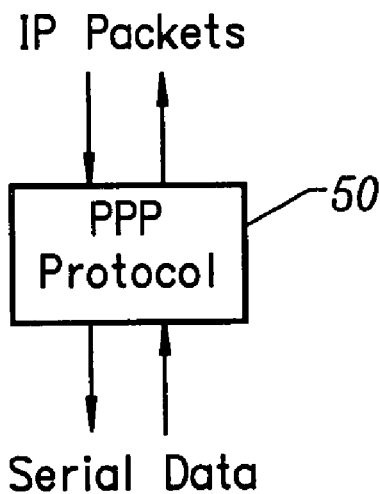
FIG. 5 is a block schematic showing a PPP function according to the invention.

At a minimum, just PPP can be added to the modem. The function of PPP is to transform IP packets (blocks of data) into a serial stream so that it can be transported over a serial device (see FIG. 5). The PPP protocol is also responsible for negotiating the parameters that are used to transmit data over the serial link (e.g. compression schemes and escaped bytes). With the PPP function 50 performed inside the modem, the communication between the modem and the IP protocol stack software operates in a manner that is similar to that in which an IP stack communicates with an Ethernet card.

As with an Ethernet card, packets are shipped from the IP protocol stack to the device driver. In the modem's case, the device driver is a simple interfacing software program that transfers blocks of data to and from the modem and the host computer. Compare the architecture of the prior art modem of FIG. 6a with that of a modem according to the invention, as shown in FIG. 6b.

This embodiment of the invention enables all of the efficiency benefits described above, and is an attractive solution because it can be implemented by adding only a minimum amount of extra logic to existing modem chip sets, and because it requires as little as 512 bytes of memory for support. This makes it very cost affordable to add to any existing modem.

Latency Optimization

Traditional modems have no knowledge of the type of data they carry and their protocols are optimized for interactive character based interfaces. The traditional modem protocols have a built in 50 ms delay before sending information. This delay is present because the modem has no idea of where the data stops and starts, so it waits until it knows no more data are going to be sent.

With the popularity of the Internet, almost all modems today are used to connect to the Internet. Using this knowledge and the information on when the packets begin and end can help optimize modem transmissions. This optimization can reduce the amount of time it takes to move an Internet protocol packet from one modem to another by reducing or eliminating the 50 ms delay built into the modem protocols. This feature of the invention can be extended using different parts of the network packet to make decisions whether there should be any delay or how long it should be before the modem processes a packet. The hardware module that handles this optimization is the packet analyzer block 34 (see FIG. 3).

Basic End of Packet Optimization

At the most basic level, one could use the knowledge of the end of the PPP packet to tell the modem protocols to wait a small amount of time before sending the packet (see FIG. 7). In the traditional modem model, if there were not enough bytes to make a modem protocol frame (such as V42) the modem would wait for more data, up to 50 ms, before timing out and sending the packet. With knowledge of the end of the PPP packet and the encapsulated protocol, the modem could expedite the sending of the packet knowing that it has a complete packet.

This algorithm is useful for PPP sub-protocols, such as LCP (Link Control Protocol), PAP (password Authentication Protocol), CHAP (Challenge Handshake Authentication Protocol), and NCP (Network Control Protocol). With these and similar PPP sub-protocols, packets transmitted are standalone in that all information is contained within a single packet. Also, in most cases after the packet is sent, no further data are sent because the device is waiting for a response from the other device. Therefore, if the packet analyzer detects that a PPP packet contains a PPP sub-protocol, when it detects the PPP FCS field it can instruct the modem to wait only 2 ms before sending the data, instead of the normal 50 ms. The reason to wait a minimum of at least 2 ms is that in the transition between the LCP, Authentication, and NCP phases of the PPP negotiations, back to back packets can be sent out. However, there would never be more than two back to back packets, and the second packet always follows immediately within 2 ms of the first packet.

Further optimization can occur by looking at the command code of the PPP sub-protocol packet. An example matrix of command types and the corresponding latency setting are shown in the Table 2 below.

TABLE 2

Matrix of Command Types and Corresponding Latency Setting

| Protocol | | Command Code | Latency Setting |
|---|---|---|---|
| LCP | 0x01 | Configuration Request | 0 ms |
| | 0x02 | Configuration Ack | 2 ms |
| | 0x03 | Configuration Nak | 0 ms |
| | 0x04 | Configuration Reject | 0 ms |
| | 0x05 | Termination Request | 0 ms |
| | 0x06 | Termination Acl | 0 ms |
| | 0x07 | Code Reject | 2 ms |
| | 0x08 | Protocol Reject | 2 ms |
| | 0x09 | Echo-Request | 2 ms |
| | 0x0A | Echo-Reply | 2 ms |
| | 0x0B | Discard-Request | 2 ms |
| PAP | 0x01 | Authentication-Request | 0 ms |
| CHAP | 0x02 | Challenge Response | 2 ms |
| NCP | 0x01 | Configuration Request | 0 ms |
| | 0x02 | Configuration Ack | 2 ms |
| | 0x03 | Configuration Nak | 0 ms |
| | 0x04 | Configuration Reject | 0 ms |
| | 0x05 | Termination Request | 0 ms |
| | 0x06 | Termination Acl | 0 ms |

Optimizing Based on IP Header Fields

Optimizing Based on the TOS Field

FOR IP, TCP, and UDP packets, a more intelligent decision on how long to wait or when to send packets can be determined by examining the type of service (TOS) field in the IP header. The TOS field describes the priority and reliability requested for the packet. The properties that are settable for the TOS field are Minimize Delay, Maximize Throughput, Maximize Reliability, and Minimize Cost. More than one of the TOS flag properties can be set at one time. This information can be used to set variable waiting time delays or to send what is in the modem buffer immediately.

Figure 8:
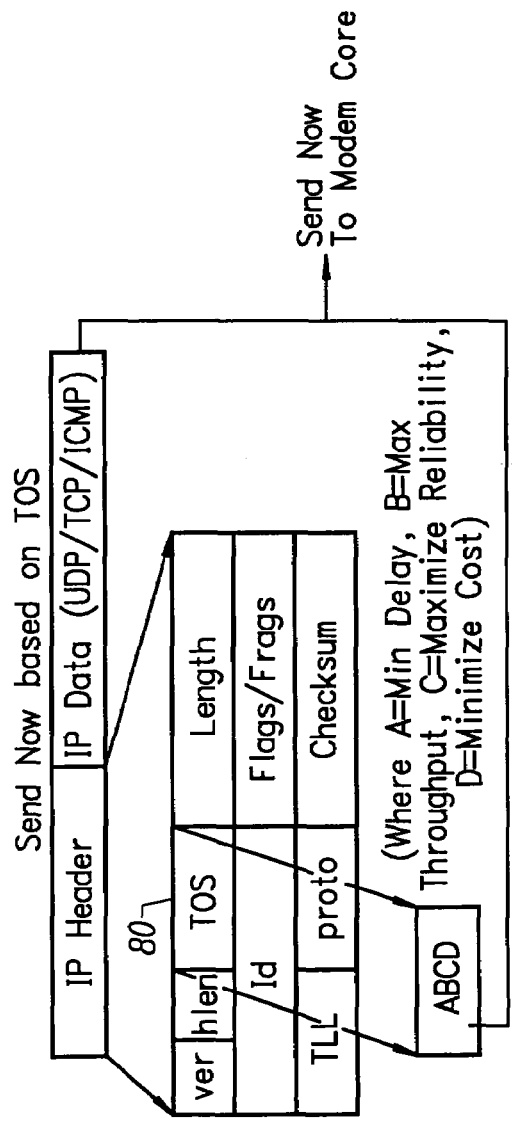
FIG. 8 is a block schematic diagram showing optimization based on TOS according to the invention.

FIG. 8 shows how it is possible to look inside the TOS flag 80 for a minimize delay property and use that information and the information on when the IP packet ends to tell the modem protocols to send the packet immediately.

Optimizing Based on the Encapsulated Protocol

Another optimization that can be performed based on IP header fields is to base the latency setting on the protocol field. Most ICMP and IGMP packets are self contained therefore minimum wait times are needed after they are sent. After the packet analyzer determines that the IP packet contains either an IGMP or ICMP packet, it signals to the modem core to send the packet immediately.

Optimization Based on Packet Ports

Figure 9:
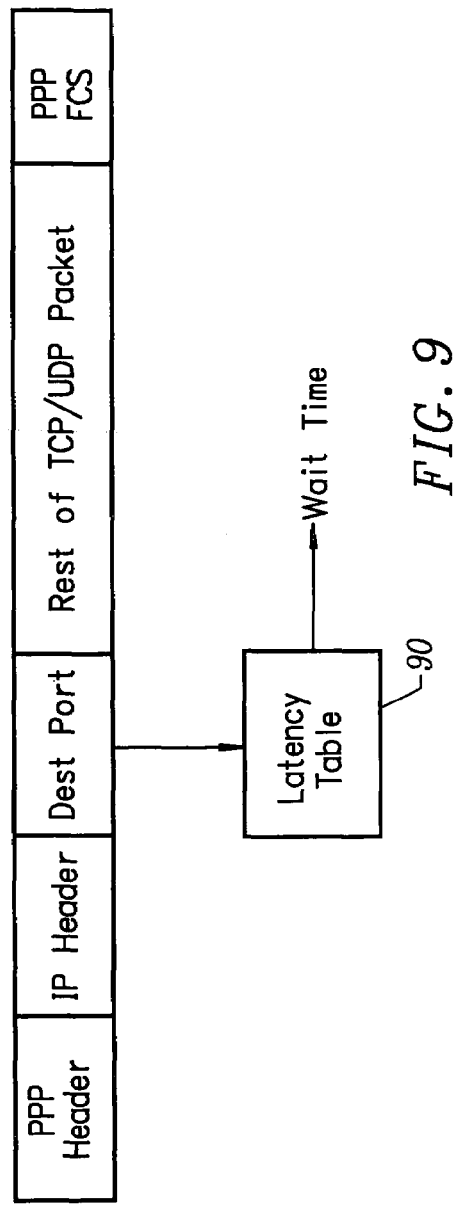
FIG. 9 is block diagram showing an optimization based on destination port according to the invention.

Certain kinds of Internet services have information distributions that require just one packet of data to be sent and received. With these types of services it is optimal always to send a packet immediately without waiting for more data. Other Internet services have yet other packet distribution patterns that could be optimized for UDP and TCP, the major protocols that are used on top of IP. Both use ports to describe services. FIG. 9 provides an example of how the port information carried in both UDP and TCP is used to optimize modem latency.

The latency table 90 contains a table of ports and the amount of time to wait after the end of the packet for more data. An example of optimizing using this method is the DNS application. In this application, the entire data portion of the message can easily fit in one Internet packet. Therefore, if after examining the destination port in the UDP header it is determined that it is a DNS packet, the packet can be sent immediately because there are not any further packets coming. Table 3 below provides an example protocol-port latency table.

TABLE 3

Latency Table - Example I

| Protocol | Port | Application | Wait Time |
|---|---|---|---|
| TCP | 0x07 | Echo | 0 ms |
| | 0x17 | Telnet | 50 ms |
| | 0x19 | SMTP | 10 ms |
| | 0x50 | HTTP | 0 ms |
| | 0x6E | POP3 | 0 ms |
| UDP | 0x07 | Echo | 0 ms |
| | 0x53 | DNS | 0 ms |

Latency Optimization Based on Packet State

TCP is a state-based protocol and certain states have well known properties that can be used for latency optimization. An example is the three-way handshake with which all TCP connections start. The first few packets of this transaction are small packets that must be sent before any further communications can take place. The invention can noticeably improve the time this connection process takes. This can be a very noticeable improvement, especially when operating software that connects many TCP connections at one time during one transaction, as with a Web browser.

Figure 10:
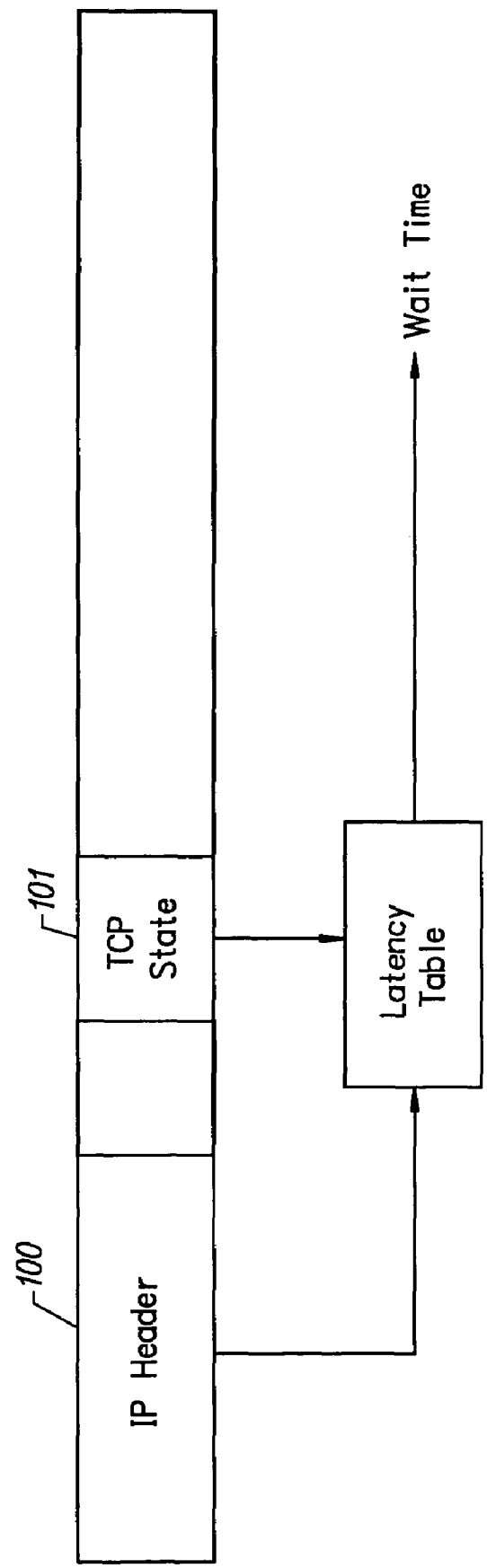
FIG. 10 is a block schematic diagram showing an optimization based on packet state according to the invention.

In FIG. 10, information from the IP header (TCP protocol type) 100 and the TCP state 101 are used to look up a latency value to pass through to the modem protocol at the end of the packet. Table 4 below provides an example latency table using this information.

TABLE 4

Latency Table - Example II

| TCP Flags | | | | | | |
|---|---|---|---|---|---|---|
| URG | ACK | PSH | RST | SYN | FIN | Wait Time |
| X | 1 | 0 | 0 | X | 0 | 2 ms |
| X | X | X | X | 1 | X | 2 ms |
| X | X | X | X | X | X | 2 ms |
| X | X | 1 | X | X | X | 50 ms |

X = Don't Care

The Latency Table

Latency tables are state machines that have a number of inputs that are triggered by a packet's characteristics. From these inputs the latency table produces an optimized latency value for the modem protocol, effectively optimizing each packet as it passes through the system. A block schematic diagram of the latency tables is shown in the FIG. 11, in which the information discussed above is combined.

The IP latency resolver 110 takes the inputs from the IP sub-protocol latency table 111 and the IP TOS field latency table 112 and selects the lower of the two values. The TCP latency resolver 113 performs a similar function for the destination port latency table 114 and the TCP state latency table 115. The IP latency resolver and TCP latency resolver outputs are muxed 117 to produce a combined latency value therefor. (The mux selection is determined by the protocol field in the IP header as parsed by the IP Sub-Protocol Latency Table 111.) A value is also provided by the PPP latency table 116. This value is muxed with the muxed 117 value of the IP latency resolver and TCP latency resolver. The mux selection for mux 118 is determined by the protocol field in the PPP header as parsed by the PPP latency table 116. The final latency value is then sent to the modem subsystem.

Modem as a Complete Internet Access Device

Figures 11, 12:
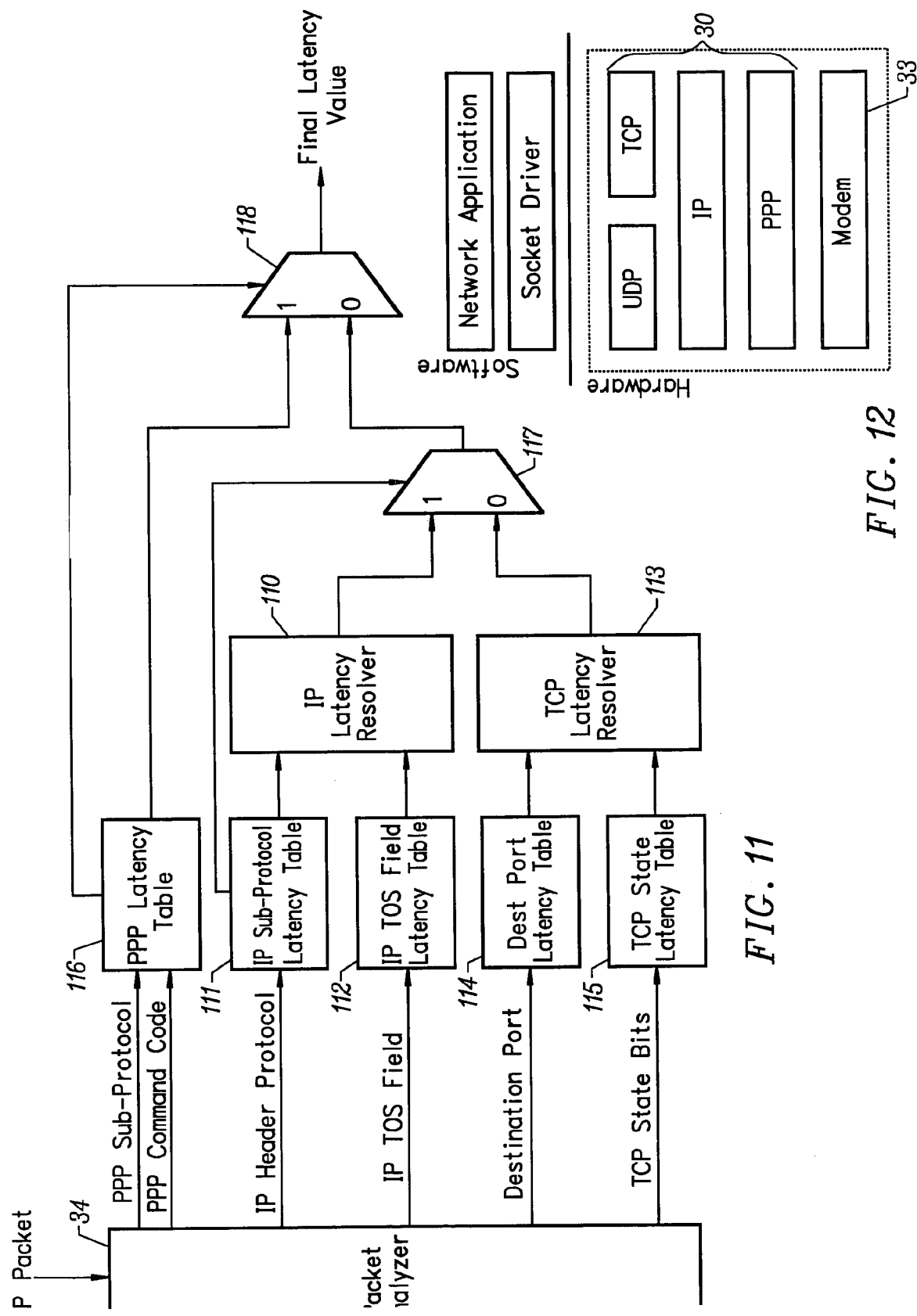
FIG. 11 is a block schematic diagram showing combined latency tables according to the invention.
FIG. 12 is a block schematic diagram showing an enhanced modem system according to the invention.

The extended Internet modem model is a stand alone, embeddable, highly integrated communications product that can Internet enable almost any electronic device (see FIG. 12). This solution has a number of advantages over the processor based solutions discussed above. More specifically, this architecture allows the addition of Internet support to non-computer applications, such as game consoles and VCR's. It is also very useful for those devices that have limited memory footprints and do not need network support all the time. An example of this is Palm Pilot type devices, where the only time the added network support is needed is when the modem is used. An advantage of the invention is that it is not necessary to waste memory resources on features that are not used all the time.

Enhanced Security Benefits

As stated above, one security benefit of having a hardware based network stack is that only those packets received that are destined for a preconfigured socket connection are allowed past the modem subsystem. All other packets are filtered out at the hardware level, making any interaction between these packets and software impossible. Also, with the addition of the HTML sniffer, V-Chip like filtering can be provided that cannot be easily circumvented. Block diagrams of the HTML sniffer are shown in FIGS. 13 and 14.

Figure 13:
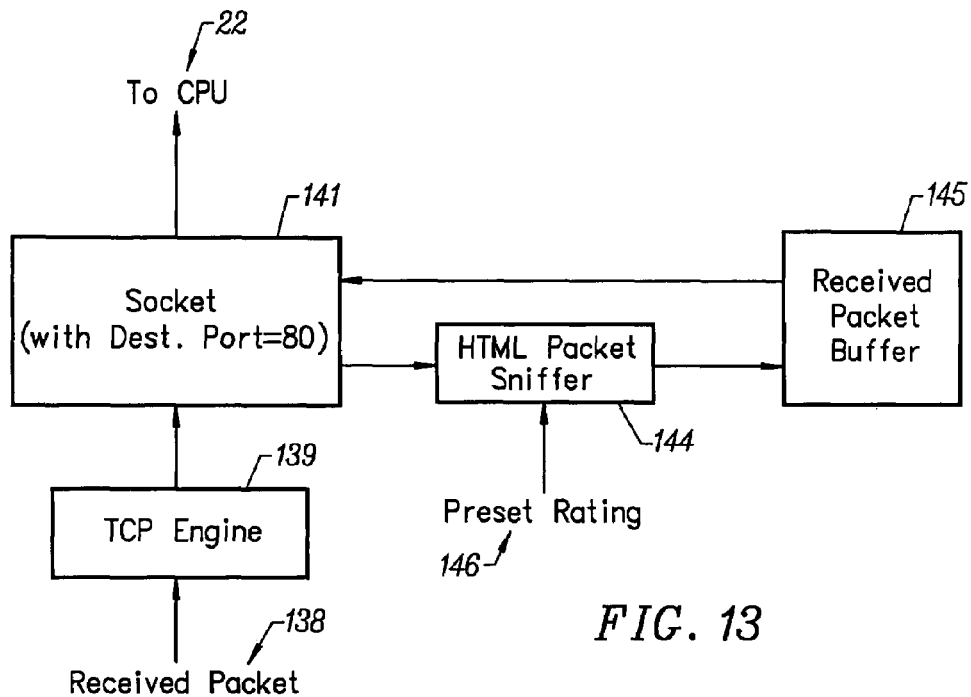
FIG. 13 is a block schematic diagram showing received packet data flow through an HTML sniffer according to the invention.

In FIG. 13, a packet 138 is received at the TCP engine 139. The packet is destined for a specific socket. The HTML packet sniffer 144 has a preset rating 146 that is applied to the packet to determine if the packet is to be placed in the received packet buffer 145.

Figure 14:
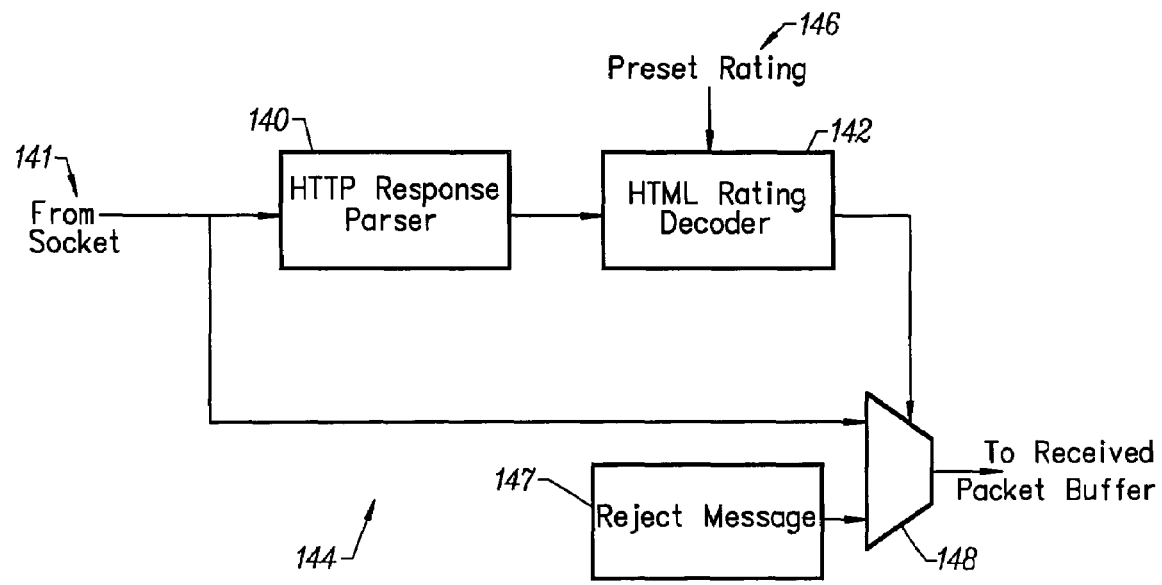
FIG. 14 is a block schematic diagram showing an HTML sniffer according to the invention.

As shown in FIG. 14, within the HTML packet sniffer, the HTTP response parser 140 takes received packets from the socket 141, and interprets the HTTP header to determine if the data content contains valid HTML data. If so, it enables the HTML rating decoder 142, which begins to parse the HTML data for rating tags. The HTML decoder writes all received data to the received packet buffer 145 (including the HTTP header), and at the same time parses tags. If it detects a rating tag, it compares the page's rating to the card's preset rating level. If it passes, then the page continues to be stored in the receive buffer. If the page fails, then all further data are suppressed, the memory buffer is reset to the point prior to receiving the current packet, and a reject message is stored in memory. If the page contains no ratings at the head of the page, the card can either be configured to pass the page or reject the page.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A modem, comprising:
   a modem core;
   a network stack which executes network protocols to allow said modem to communicate on an electronic network; and
   an HTML (HyperText Markup Language) packet sniffer which parses received HTML data;
   wherein said HTML packet sniffer further comprises:
   an HTML decoder that writes all received data to a received packet buffer, and at the same time parses tags;
   wherein, if said HTML decoder detects a rating tag, it compares a corresponding page's rating to a preset rating level;
   wherein, if said page passes, then said page continues to be stored in a receive buffer;
   wherein if said page fails, then all further data are suppressed and a reject message is stored in memory; and
   wherein if said page contains no ratings at a head of said page, said modem is configured to either pass the page or reject said page based upon a user configuration.

2. The modem of claim 1, wherein said network stack comprises:
   an Internet network protocol stack.

3. The modem of claim 1, wherein said network stack sends and receives blocks of data.

4. The modem of claim 1, wherein network protocols that are implemented in said network stack include any of the protocols required by PPP (Point-to-Point Protocol), IP (Internet Protocol), TCP (Transmission Control Protocol), and UDP (User Datagram Protocol) communications layers.

5. The modem of claim 1, wherein said network stack supports direct memory access (DMA) operations to optimize CPU overhead required for data transfers.

6. The modem of claim 1, wherein said network stack performs PPP, IP, and TCP packet snooping.

7. The modem of claim 1, wherein a TOS (Type-Of-Service) field in an IP header is used by said network stack to determine the amount of latency used in the transmission of a packet.

8. The modem of claim 1, wherein said network stack performs latency optimization by checking a TCP header.

9. The modem of claim 1, wherein all protocol negotiations are kept local to said modem by said network stack.

10. The modem of claim 1, wherein said network stack disregards any packet received unless there is already a socket connection set up for it.

11. The modem of claim 1, further comprising:
    a packet sniffer for decoding HTML rating tags, wherein said packet sniffer only passes those pages that are within a preset rating level.

12. The modem of claim 11, wherein said packet sniffer is configured either not to pass unrated pages that do not include a rating tag at all, or to allow said unrated pages to be passed.

13. The modem of claim 11, wherein the preset rating level programmed via hard wired settings.

14. The modem of claim 1, wherein software applications communicate with said modem via a socket API.

15. A modem, comprising:
    a modem core;
    a network stack embedded in hardware which executes network protocols to allow said modem to communicate on an electronic network, wherein said network stack comprises an Internet network protocol stack; and an HTML packet sniffer which parses received HTML data;

wherein said HTML packet sniffer further comprises:

an HTML decoder that writes all received data to a received packet buffer, and at the same time parses tags;

wherein, if said HTML decoder detects a rating tag, it compares a corresponding page's rating to a preset rating level;

wherein, if said page passes, then said page continues to be stored in a receive buffer;

wherein if said page fails, then all further data are suppressed and a reject message is stored in memory; and wherein if said page contains no ratings at a head of said page, said modem is configured to either pass the page or reject said page based upon a user configuration.

16. The modem of claim 15, wherein said network stack further comprises:

a PPP stack for transforming IP packets into a serial stream for transport over a serial link, and for negotiating parameters that are used to transmit data over said serial link 17. The modem of claim 15, further comprising:

a packet analyzer module for using different parts of a network packet to make decisions whether there should be a delay and, if so, how long it should be before said modem processes a packet.

18. The modem of claim 15, further comprising:

a packet analyzer module for using knowledge of the end of a PPP packet to instruct said modem to wait a minimum amount of time before sending a packet.

19. The modem of claim 18, wherein said packet analyzer module detects PPP sub-protocols, including any of LCP (Link Control Protocol), PAP (password Authentication Protocol), CHAP (Challenge Handshake Authentication Protocol), and NCP (Network Control Protocol), and other PPP sub protocols, and uses this information to determine the amount of latency used in the transmission of a packet.

20. The modem of claim 19, wherein said packet analyzer module examines a command code of a PPP sub-protocol packet, and uses this information to determine the amount of latency used in the transmission of a packet.

21. The modem of claim 18, wherein said packet analyzer module examines a type of service (TOS) field in an IP header to determine the amount of latency used in the transmission of packets.

22. A modem, comprising:

a modem core;

a network stack which executes network protocols to allow said modem to communicate on an electronic network; and a packet analyzer module for using knowledge of the end of a PPP packet to instruct said modem to wait a minimum amount of time before sending a packet;

wherein said packet analyzer module examines a type of service (TOS) field in an IP header to determine the amount of latency used in the transmission of packets;

wherein said TOS field describes priority and reliability requested for a packet.

23. A modem, comprising:

a modem core;

a network stack which executes network protocols to allow said modem to communicate on an electronic network; and a packet analyzer module for using knowledge of the end of a PPP packet to instruct said modem to wait a minimum amount of time before sending a packet;

wherein said packet analyzer module examines a type of service (TOS) field in an IP header to determine the amount of latency used in the transmission of packets;

wherein properties that are settable for said TOS field include any of Minimize Delay, Maximize Throughput, Maximize Reliability, and Minimize Cost.

24. The modem of claim 23, wherein more than one of said TOS flag properties is set at one time.

25. The modem of claim 18, wherein said packet analyzer module examines a TOS flag for a minimize delay property, and wherein said network stack uses said minimize delay property and information on when an IP packet ends to instruct said modem to send a packet immediately.

26. The modem of claim 18, wherein an optimization is performed based on IP header fields.

27. The modem of claim 26, wherein a latency setting is based on a protocol field.

28. The modem of claim 26, wherein port information carried in both UDP and TCP is used to optimize modem latency.

29. The modem of claim 15, further comprising:

a latency table.

30. The modem of claim 29, wherein said latency table comprises:

a table of protocols;

a table of ports; and a table of amount of time to wait after the end of a packet for more data.

31. The modem of claim 29, wherein information from any of an IP header and a TCP state is used to look up a latency value to pass through to said modem protocol at the end of said packet.

32. The modem of claim 15, wherein said modem comprises:

a stand alone, embeddable, highly integrated communications product that is Internet enable for a wide variety of electronic devices.

33. The modem of claim 15, further comprising:

a TCP socket filter, wherein only those packets received at said modem that are destined for a preconfigured socket connection are allowed past said modem; and wherein all other packets are filtered out at by said socket filter at the hardware level.

34. The modem of claim 1, wherein said HTML packet sniffer further comprises:

a preset rating that is applied to a packet to determine if said packet is to be placed in a received packet buffer.

35. The modem of claim 1, wherein said HTML packet sniffer further comprises:

an HTTP response parser that takes received packets from a socket, and that interprets an HTTP header to determine if data therein contains valid HTML data and, if so, that enables an HTML rating decoder, which begins to parse said HTML data for rating tags.

36. A modem, comprising:

a modem core;

a network stack which executes network protocols to allow said modem to communicate on an electronic network, wherein said network stack comprises an Internet network protocol stack, wherein said network stack sends and receives blocks of data, wherein network protocols that are implemented in said network stack include any of the protocols required by PPP, IP, TOP, and UDP communications layers, wherein said network stack supports direct memory access (DMA) operations to optimize CPU overhead required for data transfers; and an HTML packet sniffer which parses received HTML data;
wherein said HTML packet sniffer further comprises:
an HTML decoder that writes all received data to a received packet buffer, and at the same time parses tags;
wherein, if said HTML decoder detects a rating tag, it compares a corresponding page's rating to a preset rating level;
wherein, if said page passes, then said page continues to be stored in a receive buffer;
wherein if said page fails, then all further data are suppressed and a reject message is stored in memory; and
wherein if said page contains no ratings at a head of said page, said modem is configured to either pass the page or reject said page based upon a user configuration.

37. A method for producing a modem, comprising the steps of:
providing a modem core;
embedding a network stack, said network stack executing network protocols to allow said modem to communicate on an electronic network; and
embedding an HTML packet sniffer which parses received HTML data;
wherein said HTML packet sniffer further comprises;
an HTML decoder that writes all received data to a received packet buffer, and at the same time parses tags;
wherein, if said HTML decoder detects a rating tag, it compares a corresponding page's rating to a preset rating level;
wherein, if said page passes, then said page continues to be stored in a receive buffer;
wherein if said page fails, then all further data are suppressed and a reject message is stored in memory; and
wherein if said page contains no ratings at a head of said page, said modem is configured to either pass the page or reject said page based upon a user configuration.

38. The method of claim 37, wherein said network stack comprises an Internet network protocol stack, wherein said network stack sends and receives blocks of data, wherein network protocols that are implemented in said network stack include any of the protocols required by PPP, IP, TCP, and UDP communications layers, wherein said network stack supports direct memory access (DMA) operations to optimize CPU overhead required for data transfers.

39. The method of claim 37, further comprising the step of: performing PPP, IP, and TCP packet snooping.

40. The method of claim 37, further comprising the step of: using a TOS field in an IP header to determine the amount of latency used in the transmission of a packet.

41. The method of claim 37, further comprising the step of: performing latency optimization by checking a TCP header.

42. The method of claim 37, wherein all protocol negotiations are kept local to said modem by said network stack.

43. The method of claim 37, wherein said network stack disregards any packet received unless there is already a socket connection set up for it.

44. The method of claim 37, further comprising the step of: providing a packet sniffer for decoding HTML rating tags, wherein said packet sniffer only passes those pages that are within a preset rating level.

45. The method of claim 44, wherein said packet sniffer is configured either not to pass unrated pages that do not include a rating tag at all, or to allow said unrated pages to be passed.

46. The method of claim 44, wherein a rating level is programmed only via hard wired settings.

47. The method of claim 37, wherein software applications communicate with said modem core and said network stack via a socket API.

48. An apparatus, comprising:
a core;
a network stack embedded in hardware which utilizes at least one network protocol to allow said apparatus to communicate on an electronic network, wherein said network stack comprises an Internet network protocol stack, wherein said at least one network protocol includes at least one of the protocols required by PPP, IP, TOP, or UDP communications layers, wherein said apparatus supports direct memory access (DMA) operations; and
an HTML packet sniffer which parses received HTML data;
wherein said HTML packet sniffer further comprises:
an HTML decoder that writes all received data to a received packet buffer, and at the same time parses tags;
wherein, if said HTML decoder detects a rating tag, it compares a corresponding page's rating to a preset rating level;
wherein, if said page passes, then said page continues to be stored in a receive buffer;
wherein if said page fails, then all further data are suppressed and a reject message is stored in memory; and
wherein if said page contains no ratings at a head of said page, said modem is configured to either pass the page or reject said page based upon a user configuration.

* * * * *

UNITED STATES PATENT AND TRADEMARK OFFICE
CERTIFICATE OF CORRECTION

PATENT NO. : 7,483,375 B2
APPLICATION NO. : 10/851357
DATED : January 27, 2009
INVENTOR(S) : Johnson et al.

Page 1 of 1

It is certified that error appears in the above-identified patent and that said Letters Patent is hereby corrected as shown below:

Claim 12, col. 14, lines 55-56, please insert -- is -- before "programmed" and after "level";
Claim 19, col. 15, line 33, please replace "password" with -- Password --;
Claim 30, col. 16, line 27, please insert -- an -- before "amount" and after "of";
Claim 32, col. 16, line 36, please replace "enable" with -- enabled --;
Claim 36, col. 16, line 63, please replace "TOP" with -- TCP --;
Claim 48, col. 18, line 29, please replace "TOP" with -- TCP --.

Signed and Sealed this
Seventeenth Day of May, 2011

David J. Kappos
*Director of the United States Patent and Trademark Office*